United States Patent
Reding et al.

(10) Patent No.: US 12,045,874 B2
(45) Date of Patent: Jul. 23, 2024

(54) METHODS AND SYSTEMS FOR GENERATING RECOMMENDATIONS FOR CONTACTING USERS THROUGH THE USE OF A CONTEXTUAL MULTI-ARMED BANDIT FRAMEWORK

(71) Applicant: Capital One Services, LLC, McLean, VA (US)

(72) Inventors: Luke Reding, McLean, VA (US);
Gilbert Forsyth, McLean, VA (US);
Aaron Slowey, McLean, VA (US);
Christopher Flynn, McLean, VA (US);
Charles DeVore, McLean, VA (US);
William Biscarri, McLean, VA (US);
Ryan McCarthy, McLean, VA (US);
Rifat Jafreen, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 570 days.

(21) Appl. No.: 16/904,336

(22) Filed: Jun. 17, 2020

(65) Prior Publication Data
US 2021/0398172 A1  Dec. 23, 2021

(51) Int. Cl.
*G06Q 40/03*  (2023.01)
*G06Q 10/0637*  (2023.01)

(52) U.S. Cl.
CPC ....... *G06Q 40/03* (2023.01); *G06Q 10/06375* (2013.01)

(58) Field of Classification Search
CPC ..... H04L 51/56; H04L 51/212; H04L 51/214; G06N 20/00; G06N 3/084; G06Q 10/06375; G06Q 40/025; G06Q 30/0281; G06Q 40/03
See application file for complete search history.

(56) References Cited

U.S. PATENT DOCUMENTS

| | | | |
|---|---|---|---|
| 9,088,533 B1* | 7/2015 | Zeng | H04L 51/234 |
| 10,242,381 B1* | 3/2019 | Zappella | G06Q 30/0245 |
| 11,151,467 B1* | 10/2021 | Shtein | G06N 7/00 |
| 2008/0171573 A1* | 7/2008 | Eom | H04L 67/535 |
| | | | 455/556.2 |
| 2012/0046068 A1* | 2/2012 | Katpelly | G06F 16/284 |
| | | | 455/550.1 |

(Continued)

OTHER PUBLICATIONS

"Multi-armed bandit models and machine learning" by Robillard. Accessed at https://blog.trueaccord.com/2020/02/multi-armed-bandit-model/. (Year: 2020).*

(Continued)

*Primary Examiner* — John S. Wasaff
(74) *Attorney, Agent, or Firm* — Perkins Coie LLP

(57) ABSTRACT

Methods and systems are described for machine learning algorithms that dynamically allocate traffic to contact strategies that are performing well, while allocating less traffic to contact strategies that are underperforming. In particular, the methods and systems discussed are for the use of a contextual multi-armed bandit framework for applications that have both immediate results and long-term results, in which immediate results are correlated with the long-term results (e.g., results related to debt collection strategies).

16 Claims, 5 Drawing Sheets

(56) References Cited

U.S. PATENT DOCUMENTS

| | | | | |
|---|---|---|---|---|
| 2013/0325755 | A1* | 12/2013 | Arquette | H04L 51/52 |
| | | | | 706/12 |
| 2015/0350376 | A1* | 12/2015 | Vijay | H04L 51/222 |
| | | | | 709/204 |
| 2015/0381552 | A1* | 12/2015 | Vijay | H04L 63/102 |
| | | | | 709/206 |
| 2017/0063735 | A1* | 3/2017 | Gillespie | H04L 51/214 |
| 2018/0089592 | A1* | 3/2018 | Zeiler | G06N 3/045 |
| 2019/0138944 | A1* | 5/2019 | Sinha | G06N 20/00 |
| 2020/0019983 | A1* | 1/2020 | Johnston, Jr. | G06N 7/01 |
| 2020/0311487 | A1* | 10/2020 | He | G06N 20/00 |
| 2020/0409983 | A1* | 12/2020 | Miller | G06F 16/24578 |
| 2021/0065034 | A1* | 3/2021 | Diehl | H04L 41/0686 |
| 2021/0089959 | A1* | 3/2021 | Ghosh | G06N 20/00 |
| 2021/0097350 | A1* | 4/2021 | Theocharous | G06N 5/04 |
| 2021/0097626 | A1* | 4/2021 | Ben-Simhon | G06N 5/01 |

OTHER PUBLICATIONS

Ek, F., & Stigsson, R. (2015). Recommender Systems; Contextual Multi-Armed Bandit Algorithms for the purpose of targeted advertisement within e-commerce. (Year: 2015).*

Slivkins, A. (2019). Introduction to multi-armed bandits. Foundations and Trends® in Machine Learning, 12(1-2), 1-286. (Year: 2019).*

Sawant, N., Namballa, C. B., Sadagopan, N., & Nassif, H. (2018). Contextual multi-armed bandits for causal marketing. arXiv preprint arXiv:1810.01859. (Year: 2018).*

* cited by examiner

METHODS AND SYSTEMS FOR GENERATING RECOMMENDATIONS FOR CONTACTING USERS THROUGH THE USE OF A CONTEXTUAL MULTI-ARMED BANDIT FRAMEWORK

FIELD OF THE INVENTION

The invention relates to generating recommendations for contacting users through use of a contextual multi-armed bandit ("cMAB") framework in machine learning application.

BACKGROUND

In recent years, users are increasingly consuming content and performing activities on-line and/or in electronic-based mediums. In many ways, these new mediums and forms of communication have provided new techniques and scenarios for contacting users. However, as email notifications, text queries, and other electronic communications become ubiquitous, the effectiveness of contacting users using these methods begins to wane. For example, users may routinely ignore texts, block or ignore telephone calls, and emails may be directed to spam filters. Not only do these methods fail to achieve the result of contacting the user, but the provider of these notifications does not know that the method has failed.

SUMMARY

In view of this problem, methods and systems are discussed herein for generating recommendations for contacting users. For example, the methods and systems described herein use machine learning algorithms to dynamically allocate traffic to contact strategies that are performing well, while allocating less traffic to contact strategies that are underperforming. In particular, the methods and systems are discussed herein for the use of a contextual multi-armed bandit framework for applications that have both immediate results and long-term results, in which immediate results are correlated with the long-term results (e.g., results related to debt collection strategies).

In conventional systems, sequential decision-making algorithms, such as cMAB frameworks are ill-suited for these applications as the difference in time between when the short-term and long-term results are determined creates an insurmountable hurdle in dynamically allocating the traffic. For example, in order for a cMAB model to dynamically allocate traffic, the system needs to receive time-normalized results of a given contact strategy. That is, the system needs to determine the effectiveness of a strategy in order to determine whether or not to allocate traffic to that contact strategy. The disconnect between the short-term and long-term results prevents that allocation.

For example, in a cMAB framework, before making a decision, the system processes an N-dimensional feature vector (context vector) associated with a current iteration. The system uses these context vectors along with a result of a given contact strategy used in the past to make a determination of a contact strategy to use in the current iteration. Over time, the system determines the relationship between the context vectors and results such that the system can predict the next best contact strategy to use based on the feature vectors. However, if the results are not readily available, or are only partially available, the system is unable to use information on a past determination to inform a current iteration. These problems are only exacerbated in instances where results (e.g., debt collection embodiments below) are not easily quantifiable and/or present unique challenges to describing in a feature vector. For example, as discussed below, illustrative applications describe generating a feature vector based on user data and available contact strategies.

The methods and systems described herein overcome this hurdle by bifurcating the cMAB model and normalizing short-term and long-term results into separate classifications. For example, as described below, the system creates a first cMAB model, in which each of a first plurality of outputs corresponds to a probability associated with one of a first plurality of classifications for short-term results. The system then inputs the results from the first cMAB model into a second cMAB model, in which each of the second plurality of outputs corresponds to a probability associated with one of a second plurality of classifications long-term results. By bifurcating the cMAB model in this manner, results based on the first plurality of outputs (e.g., short-term results) may be used to dynamically allocate traffic contact strategies with predicted short-term-results. The results based on the second plurality of outputs (e.g., long-term results) may then be used to update the cMAB model when eventually received and in a normalized manner.

In one aspect, a system is described for generating recommendations for contacting users through use of a cMAB framework. For example, the system may input, using control circuitry, user data and available contact strategies into a first cMAB model, wherein each of the available contact strategies relates to a different interaction with a user. The system may receive, using the control circuitry, a first plurality of outputs from the first cMAB model, wherein each of the first plurality of outputs corresponds to a probability associated with one of a first plurality of classifications, and wherein each of the first plurality of classifications relates to a different short-term result of a respective contact strategy of the available contact strategies. The system may input, using the control circuitry, the first plurality of outputs from the first cMAB model into a second cMAB model. The system may receive, using the control circuitry, a second plurality of outputs from the second cMAB model, wherein each of the second plurality of outputs corresponds to a probability associated with one of a second plurality of classifications, and wherein each of the second plurality of classifications relates to a different long-term result of a respective contact strategy of the available contact strategies. The system may then generate, on a display device, a recommendation for a contact strategy based on the second plurality of outputs.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
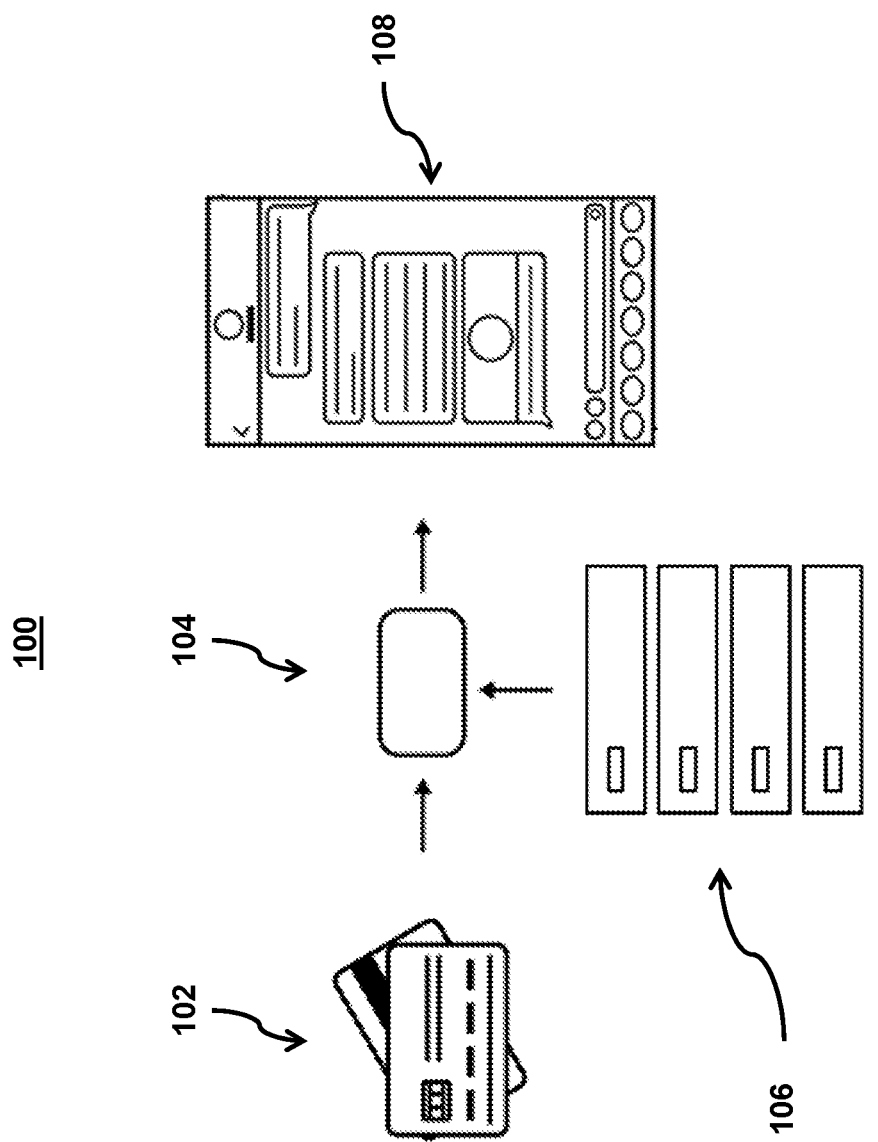
FIG. 1 shows an illustrative diagram for generating recommendations for contacting users through use of a cMAB framework, in accordance with one or more embodiments.

FIG. 1 shows an illustrative diagram for generating recommendations for contacting users through use of a cMAB framework, in accordance with one or more embodiments. In particular FIG. 1 demonstrates an illustrative embodiment relating to debt collection. For example, as shown in diagram 100, a user may accumulate debt 102 (e.g., credit card debt). Information about the user and the user's debt may be collected in a user profile. The user profile may include data of various types and from various sources. For example, the user profile may include data on credit/debit card purchases, purchasing trends (e.g., where the user spends, what the user buys, how much the user spends), phone call interactions (e.g., how often a user calls, the number called, and the number called from), digital engagement history of the user (e.g., does the user use a mobile app, what devices does the user use, when and how often does the user log in), text/chat history, map and global positioning data (e.g., where the user is located, where the user has been located in the past, areas frequented by a user, distances traveled by a user), debt history and debt collection history, and/or responses to users from contacting strategies.

The user profile may include data that is actively or passively compiled on a user. For example, the data may include demographic, geographic, and/or financial data on the user. The data may indicate the preferences, tastes, habits, and/or recent activities of the user (e.g., recent purchases). The user profile may comprise a digital representation of the user. This representation may be organized into scenarios and behaviors of the user in the scenario. The scenario may include any information about an event, course of action, or other circumstance related to the user. For example, the scenario may include where a user last shopped, where the user normally shows, what items were purchases, etc. The profile may also include a behavior for the user in the given scenario (e.g., the manner, way, characteristics, and/or any other information about the user's conduct in the scenario). The profile may also include one or more categories in which the user falls. These categories may be used by the system to select other users to compare to the user. The categories may include any information that distinguishes one user from another or from a group of users. Information in the user profile may be accessed by the system in response to a query.

In some embodiments, the system may retrieve the user profile in response to an outstanding debt exceeding a predetermined threshold. For example, the system may continually monitor debt levels of users and outstanding debt payments of users to determine whether or not a given users has a debt requiring collection. In response to determining that the given user has a debt requiring collection, the system may access information about the user and available contact strategies in order to determine how to contact the user regarding the debts. For example, the information in the user profile may include characteristics that indicate that the user is more likely to respond (or respond more positively) to a particular contact strategy.

As referred to herein, a contact strategy may be distinguished based on one or more attributes of the contact strategy. These attributes may include a medium of contact (e.g., telephone, in-person, text, email, etc.), content of the contact (e.g., a particular message that is delivered, how the message is worded, what information is or is not included with the message, etc.), a timing related to the contact (e.g., when the contact is made, including a date or time, how frequently contact is made, etc.), circumstances surrounding the contact (e.g., contacting the user at a work place, on a payday, on rainy days), and/or scenarios related to the debt (e.g., a day prior to an escalation of an interest rate, a day prior to the debt being transferred to a third party collection agency, etc.). For example, in some embodiments, the each of the available contact strategies comprises a contact strategy type, a contact strategy content, and a contact strategy frequency. In some embodiments, the available contact strategies include user-initiated contact strategies, provider-initiated contact strategies, and trigger-based contact strategies.

The contact strategy may also include attributes that define how a user is interacted with. For example, the contact strategy may include outgoing channel strategies in which a user is contacted, ingoing strategies in which a user contacts the provider (e.g., requesting information, querying her debt obligation, etc.), and trigger channels, in which contact is based on a given criteria happening or a given occurrence.

In some embodiments, the system may first determine what contact strategies are available. The availability of the contact strategy may be based on the provider, the user, or both. For example, the system may determine whether or not a user has a requirement for a contact strategy. The requirement may be based on a delivery mechanism (e.g., whether or not the user has a telephone, whether or not the user has a known address, etc.) and/or whether or not a contact strategy is approved for a given scenario. For example, an in-person contact may only be approved for debts above a predetermined threshold. In some embodiments, the system may further determine available contact strategies based on minimizing costs (e.g., third party collection fees, costs to initiate contact, reputation calls, and/or user dissatisfaction). In some embodiments, the system may compare the costs of a strategy to the outstanding debt and/or probability of a result using the contact strategy before determining that the contact strategy is available.

In diagram 100, debt 102 may be detected at point 104. At point 104, the system may retrieve user data and available contact strategies from server 106. For example, server 106 may include memory that stored a user profile a cMAB model for recommendation contact strategies. Additionally or alternatively, server 106 may store a first cMAB model and a second cMAB model. Server 106 may determine that a user has a debt requiring collection and in response to determining that the user has a debt requiring collection, input user data and available contact strategies into a first cMAB model, wherein each of the available contact strategies relates to a different interaction with a user. The user data and available contact strategies may be expressed as a feature vector in which respective values in the vector correspond to different contact strategies and user data. For example, each value in the feature vector may represent a normalized value that expressed a quantitative or qualitative measurement of the user data and/or contact strategies.

Server 106 may receive a first plurality of outputs from the first cMAB model, wherein each of the first plurality of outputs corresponds to a probability associated with one of a first plurality of classifications, and wherein each of the first plurality of classifications relates to a different short-term result of a respective contact strategy of the available contact strategies. For example, each classification may represent a float-point number corresponding to a probability of a different short-term result. The short-term result may be expressed as a combination of multiple attributes such as response time to the contact strategy, a percentage of the debt paid, an initial payment amount received from the payment strategy (e.g., during a predetermined time period such as one month), and/or other information that characterizes the results. The short-term result may itself be used to generate a feature vector that is input into a second cMAB model.

In some embodiments, each of the different short-term results is defined by a first metric and a second metric, wherein the first metric corresponds to a type of user response for the respective contact strategy, and wherein the second metric corresponds to a short-term value received. In some embodiments, each of the different short-term results is defined by a first metric and a second metric, wherein the first metric corresponds to a qualitative response for the respective contact strategy, and wherein the second metric corresponds to a quantitative response for the respective contact strategy.

Server 106 may then input the first plurality of outputs from the first cMAB model into a second cMAB model. Server 106 may then receive a second plurality of outputs from the second cMAB model, wherein each of the second plurality of outputs corresponds to a probability associated with one of a second plurality of classifications, and wherein each of the second plurality of classifications relates to a different long-term result of a respective contact strategy of the available contact strategies. For example, each classification may represent a float-point number corresponding to a probability of a different long-term result. The long-term result may be expressed by a combination of attributes such as a percentage of the debt recovered, interest fees paid, user satisfaction, an amount, rate, or other indicator of the user continuing to use the providers products (e.g., maintain credit card membership and/or bank account status) an initial payment amount received from the payment strategy (e.g., during a predetermined time period such as one month), and/or other information that characterizes the results.

In some embodiments, each of the different long-term result is defined by an expected provider profit of the respective contact strategy, wherein the expected provider profit comprises a difference between a value received by a provider and a value to institute the respective contact strategy. The long-term result may then be used to generate a recommendation of a contact strategy. For example, the system may generate a recommendation (e.g., recommendation 108) for a contact strategy for collecting the debt based on the second plurality of outputs.

The system may additionally train and/or update the information upon which the first and second cMAB model is based. For example, as short-term results are received the system may update the first cMAB model. The system may then update the first cMAB model when the long-term results are received. Likewise, the system may update the second cMAB model based on the long-term results.

Figure 2:
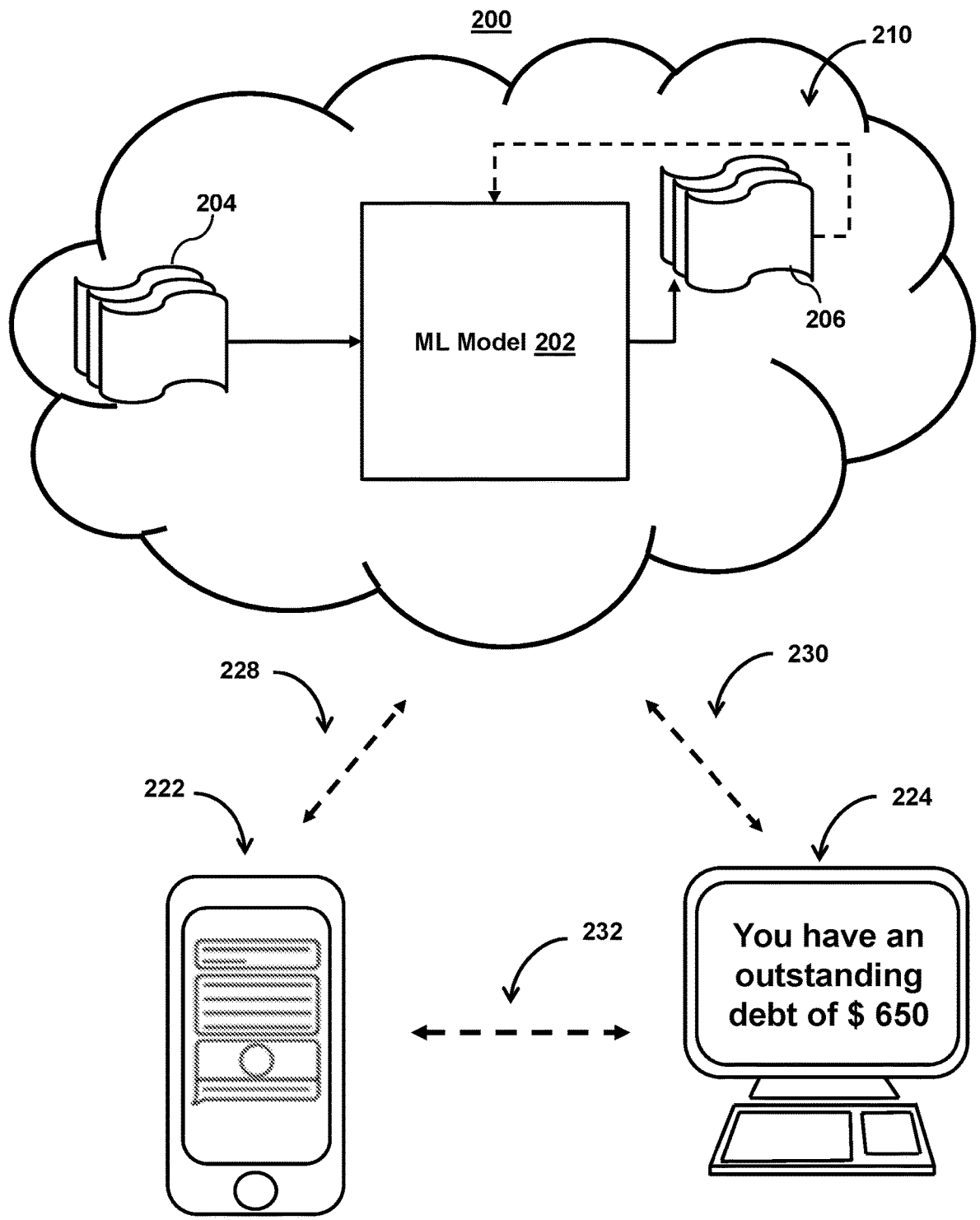
FIG. 2 shows an illustrative system for generating recommendations for contacting users through use of a cMAB framework, in accordance with one or more embodiments.

FIG. 2 shows an illustrative system for generating recommendations for contacting users through use of a cMAB framework, in accordance with one or more embodiments. For example, system 200 may represent the components used for generating recommendations for contacting users through use of a cMAB framework. As shown in FIG. 2, system 200 may include mobile device 222 and user terminal 224. While shown as a smartphone and personal computer, respectively, in FIG. 2, it should be noted that mobile device 222 and user terminal 224 may be any computing device, including, but not limited to, a laptop computer, a tablet computer, a hand-held computer, other computer equipment (e.g., a server), including "smart," wireless, wearable, and/or mobile devices. FIG. 2 also includes cloud components 210. Cloud components 210 may alternatively be any computing device as described above and may include any type of mobile terminal, fixed terminal, or other device. For example, cloud components 210 may be implemented as a cloud computing system and may feature one or more component devices. It should also be noted that system 200 is not limited to three devices. Users may, for instance, utilize one or more other devices to interact with one another, one or more servers, or other components of system 200. It should be noted that, while one or more operations are described herein as being performed by particular components of system 200, those operations may, in some embodiments, be performed by other components of system 200. As an example, while one or more operations are described herein as being performed by components of mobile device 222, those operations may, in some embodiments, be performed by components of cloud components 210. In some embodiments, the various computers and systems described herein may include one or more computing devices that are programmed to perform the described functions. Additionally or alternatively, multiple users may interact with system 200 and/or one or more components of system 200. For example, in one embodiment, a first user and a second user may interact with system 200 using two different components.

With respect to the components of mobile device 222, user terminal 224, and cloud components 210, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing circuitry. Each of these devices may also include a user input interface and/or user output interface (e.g., a display) for use in receiving and displaying data. For example, as shown in FIG. 2, both mobile device 222 and user terminal 224 include a display upon which to display data (e.g., based on recommended contact strategies).

Additionally, as mobile device 222 and user terminal 224 are shown as touchscreen smartphones, these displays also act as user input interfaces. It should be noted that in some embodiments, the devices may have neither user input interface nor displays and may instead receive and display content using another device (e.g., a dedicated display device such as a computer screen and/or a dedicated input device such as a remote control, mouse, voice input, etc.). Additionally, the devices in system 200 may run an application (or another suitable program). The application may cause the processors and/or control circuitry to perform operations related to generating recommendations based on records collected by a third party during content exchanges between users and content sources.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 2 also includes communication paths 228, 230, and 232. Communication paths 228, 230, and 232 may include the Internet, a mobile phone network, a mobile voice or data network (e.g., a 4G or LTE network), a cable network, a public switched telephone network, or other types of communications network or combinations of communications networks. Communication paths 228, 230, and 232 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 210 may be a database configured to store user data for a user. For example, the database may include user data that the system has collected about the user through prior transactions. Alternatively or additionally, the system may act as a clearing house for multiple sources of information about the user. Cloud components 210 may also include control circuitry configured to perform the various operations needed to generate recommendations.

Cloud components 210 include machine learning model 202. Machine learning model 202 may take inputs 204 and provide outputs 206. The inputs may include multiple data sets such as a training data set and a test data set. Each of the plurality of data sets (e.g., inputs 204) may include data subsets related to user data, contact strategies, and results. In some embodiments, outputs 206 may be fed back to machine learning model 202 as input to train machine learning model 202 (e.g., alone or in conjunction with user indications of the accuracy of outputs 206, labels associated with the inputs, or with other reference feedback information). In another embodiment, machine learning model 202 may update its configurations (e.g., weights, biases, or other parameters) based on the assessment of its prediction (e.g., outputs 206) and reference feedback information (e.g., user indication of accuracy, reference labels, or other information). In another embodiment, where machine learning model 202 is a neural network, connection weights may be adjusted to reconcile differences between the neural network's prediction and the reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model 202 may be trained to generate better predictions.

In some embodiments, machine learning model 202 may include an artificial neural network. In such embodiments, machine learning model 202 may include an input layer and one or more hidden layers. Each neural unit of machine learning model 202 may be connected with many other neural units of machine learning model 202. Such connections can be enforcing or inhibitory in their effect on the activation state of connected neural units. In some embodiments, each individual neural unit may have a summation function which combines the values of all of its inputs together. In some embodiments, each connection (or the neural unit itself) may have a threshold function such that the signal must surpass before it propagates to other neural units. Machine learning model 202 may be self-learning and trained, rather than explicitly programmed, and can perform significantly better in certain areas of problem solving, as compared to traditional computer programs. During training, an output layer of machine learning model 202 may correspond to a classification of machine learning model 202 and an input known to correspond to that classification may be input into an input layer of machine learning model 202 during training. During testing, an input without a known classification may be input into the input layer, and a determined classification may be output.

In some embodiments, machine learning model 202 may include multiple layers (e.g., where a signal path traverses from front layers to back layers). In some embodiments, back propagation techniques may be utilized by machine learning model 202 where forward stimulation is used to reset weights on the "front" neural units. In some embodiments, stimulation and inhibition for machine learning model 202 may be more free-flowing, with connections interacting in a more chaotic and complex fashion. During testing, an output layer of machine learning model 202 may indicate whether or not a given input corresponds to a classification of machine learning model 202 (e.g., whether a first length of time corresponds to lengths of programming time for previously completed stories by contributors without a required skill).

Figure 3:
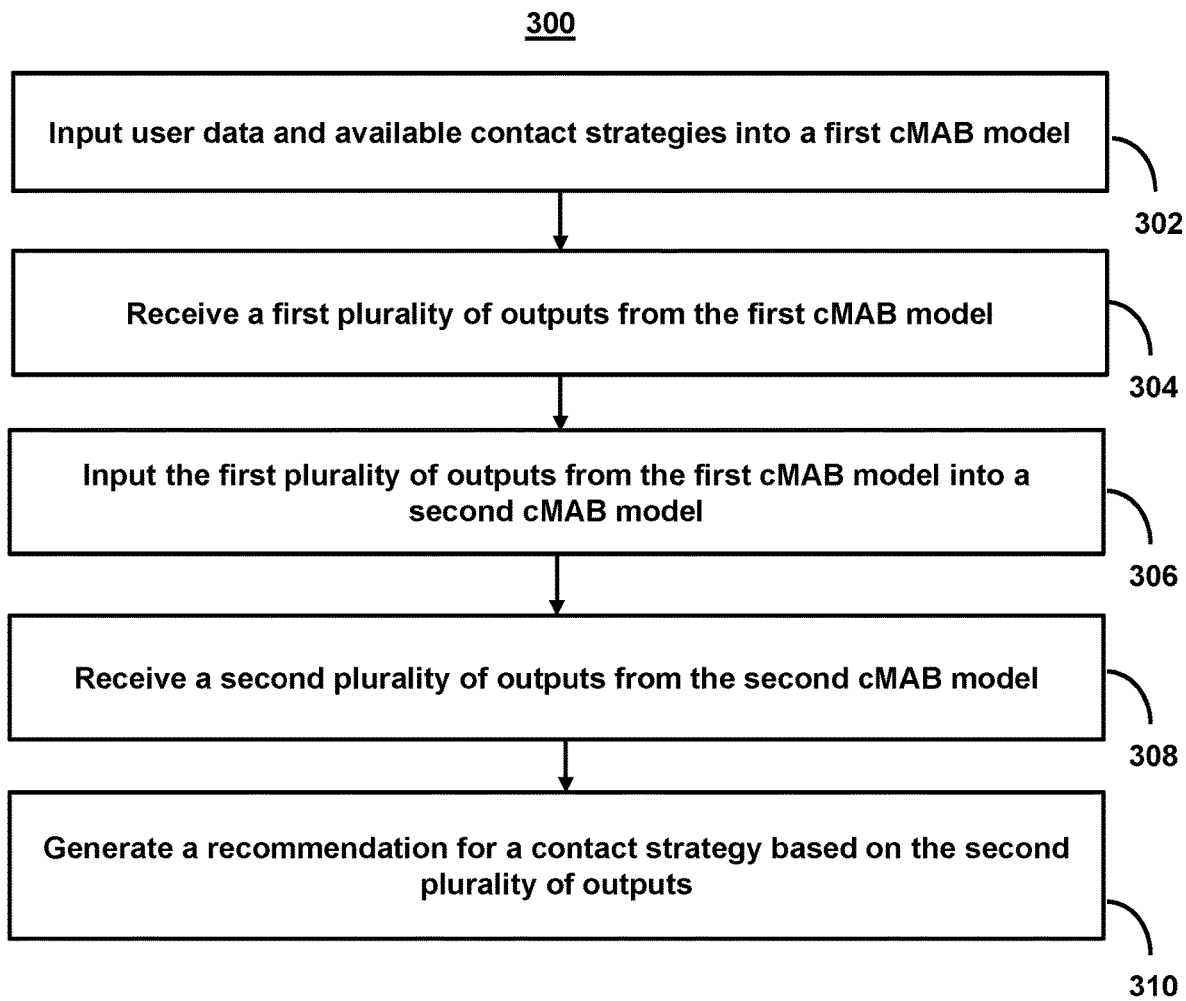
FIG. 3 shows a flowchart of the steps involved in for generating recommendations for contacting users through use of a cMAB framework, in accordance with one or more embodiments.

FIG. 3 shows a flowchart of the steps involved for generating recommendations for contacting users through use of a cMAB framework, in accordance with one or more embodiments. For example, process 300 may represent the steps taken by one or more devices as shown in FIG. 2 for generating the recommendations.

At step 302, process 300 inputs (e.g., by control circuitry of one or more of the devices in FIG. 2) user data and available contact strategies into a first cMAB model. For example, the system may input, using control circuitry, user data and available contact strategies into a first cMAB model, wherein each of the available contact strategies relates to a different interaction with a user. For example, the available contact strategies may include user-initiated contact strategies, provider-initiated contact strategies, and trigger-based contact strategies. In some embodiments, the system may determine that the user has a debt requiring collection, and the system may input the user data and available contact strategies into the first cMAB model in response.

At step 304, process 300 receives (e.g., by control circuitry of one or more of the devices in FIG. 2) a first plurality of outputs from the first cMAB model. For example, the system may receive, using the control circuitry, a first plurality of outputs from the first cMAB model, wherein each of the first plurality of outputs corresponds to a probability associated with one of a first plurality of classifications, and wherein each of the first plurality of classifications relates to a different short-term result of a respective contact strategy of the available contact strategies.

At step 306, process 300 inputs (e.g., by control circuitry of one or more of the devices in FIG. 2) the first plurality of outputs from the first cMAB model into a second cMAB model. For example, the system may input, using the control circuitry, the first plurality of outputs from the first cMAB model into a second cMAB model.

At step 308, process 300 receives (e.g., by control circuitry of one or more of the devices in FIG. 2) a second plurality of outputs from the second cMAB model. For example, the system may receive, using the control circuitry, a second plurality of outputs from the second cMAB model, wherein each of the second plurality of outputs corresponds to a probability associated with one of a second plurality of classifications, and wherein each of the second plurality of classifications relates to a different long-term result of a respective contact strategy of the available contact strategies.

At step 310, process 300 generates (e.g., by control circuitry of one or more of the devices in FIG. 2) a recommendation for a contact strategy based on the second plurality of outputs. For example, the system may generate, on a display device (e.g., mobile device 222 (FIG. 2)), a recommendation for a contact strategy based on the second plurality of outputs.

It is contemplated that the steps or descriptions of FIG. 3 may be used with any other embodiment of this disclosure. In addition, the steps and descriptions described in relation to FIG. 3 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIG. 2 could be used to perform one of more of the steps in FIG. 3.

Figure 4:
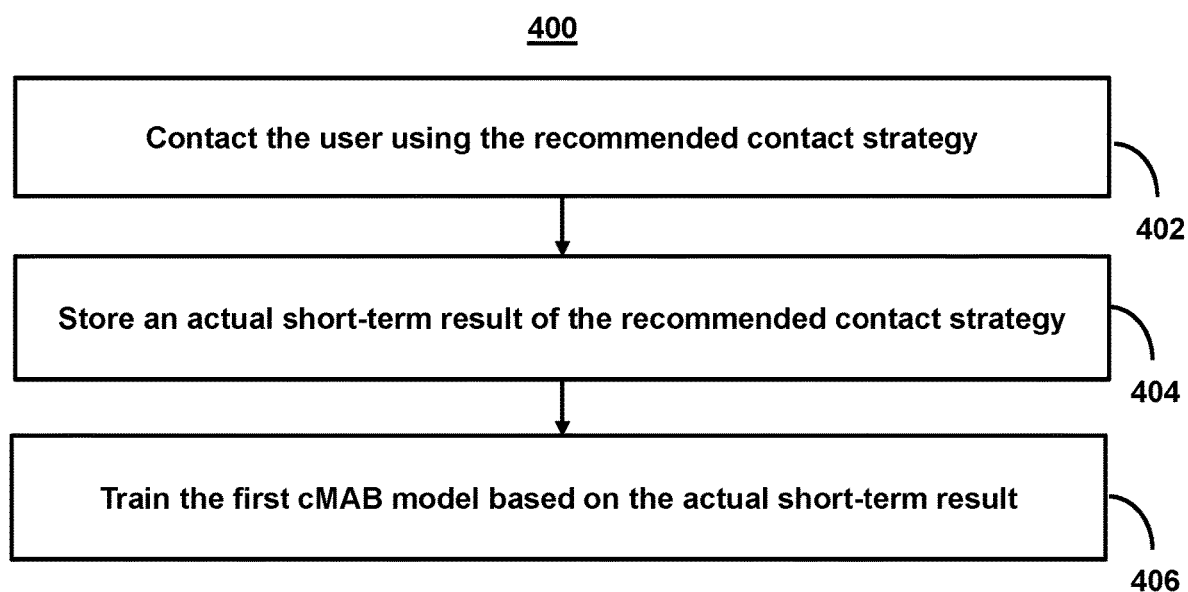
FIG. 4 shows a flowchart of the steps involved in training a first cMAB model based on an actual short-term result of a recommended contact strategy, in accordance with one or more embodiments.

FIG. 4 shows a flowchart of the steps involved in training a first cMAB model based on an actual short-term result of a recommended contact strategy, in accordance with one or more embodiments. For example, process 400 may represent the steps taken by one or more devices as shown in FIG. 3 when training a first cMAB model used to generate recommendations for contacting users.

At step 402, process 400 contacts (e.g., by control circuitry of one or more of the devices in FIG. 2) the user using the recommended contact strategy. For example, the system may contact a user using a recommended contact strategy as determined in FIG. 3.

At step 404, process 400 stores (e.g., by control circuitry of one or more of the devices in FIG. 2) an actual short-term result of the recommended contact strategy. For example, the system may store an actual short-term result of the recommended contact strategy. In some embodiments, the system may further store a metric related to actual implementation of a recommendation strategy (e.g., as discussed below in relation to FIG. 5).

At step 406, process 400 trains (e.g., by control circuitry of one or more of the devices in FIG. 2) the first cMAB model based on the actual short-term result. For example, the system may train the first cMAB model based on the actual short-term result. In some embodiments, the system may additionally store an actual long-term result of the recommended contact strategy. The system may then train a second cMAB model based on the actual long-term result.

It should be noted that in some embodiments, storing an actual short-term or long-term result may include normalizing the short-term or long-term result into a value that may be input into a feature vector. For example, the system may receive a short-term or long-term result that is based on a qualitative or quantitative assessment of the contact strategy. For example, the system may retrieve baseline metrics corresponding to a contact strategy (e.g., a type of content, a time of contact, and/or other attributes). The system may determine how similar the actual implementation of the contact strategy was to these baseline metrics as discussed in FIG. 5.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIG. 2 could be used to perform one of more of the steps in FIG. 4.

Figure 5:
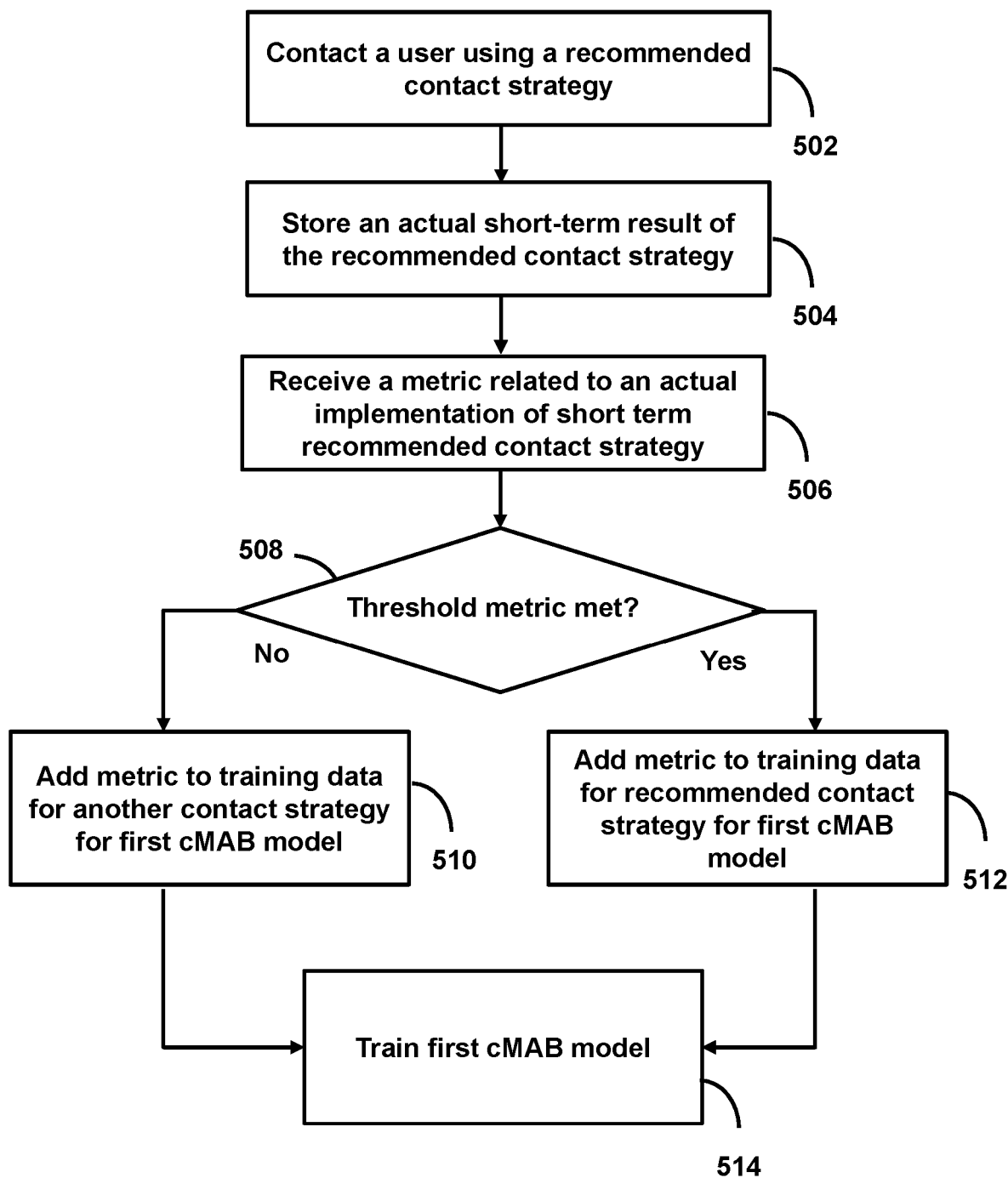
FIG. 5 shows a flowchart of the steps involved in training a second cMAB model based on an actual short-term result of a recommended contact strategy, in accordance with one or more embodiments.

FIG. 5 shows a flowchart of the steps involved in training a second cMAB model based on an actual short-term result of a recommended contact strategy, in accordance with one or more embodiments. For example, process 500 may represent the steps taken by one or more devices as shown in FIG. 2 when training a second cMAB model for generating recommendations for contacting users.

At step 502, process 500 contacts (e.g., by control circuitry of one or more of the devices in FIG. 2) a user using a recommended contact strategy. For example, the system may contact a user using a contact strategy selected from and including user-initiated contact strategies, provider-initiated contact strategies, and trigger-based contact strategies. Each of the contact strategies may include attributes such as contact strategy type, a contact strategy content, and a contact strategy frequency.

At step 504, process 500 stores (e.g., by control circuitry of one or more of the devices in FIG. 2) an actual short-term result of the recommended contact strategy. For example, the system may determine an actual short-term result and generate one or more metrics to define the short-term result.

At step 506, process 500 receives (e.g., by control circuitry of one or more of the devices in FIG. 2) a metric related to an actual implementation of short-term recommended contact strategy. The metrics may include qualitative and/or quantitative assessments of the short-term result. For example, each of the different short-term results is defined by a first metric and a second metric, wherein the first metric corresponds to a type of user response for the respective contact strategy, and wherein the second metric corresponds to a short-term value received. In another example, each of the different short-term results is defined by a first metric and a second metric, wherein the first metric corresponds to a qualitative response for the respective contact strategy, and wherein the second metric corresponds to a quantitative response for the respective contact strategy.

At step 508, process 500 determines (e.g., by control circuitry of one or more of the devices in FIG. 2) whether a threshold metric was met. For example, the system may retrieve a threshold metric for the qualitative and/or quantitative assessment of the short-term results. The system may then compare metrics corresponding to the actual implementation of the contact strategy to determine how well the contact strategy was implemented and/or if the contact strategy was implemented at all. For example, the system may determine how similar the actual implementation of the contact strategy was to the ideal scenario.

For example, while a contact strategy may have required a user to be contacted a particular number of times, at a particular time, and/or have other attributes, the contact strategy may not have been executed precisely. For example, the system may not have been able to generate a text at a particular time, a user may not have answered a telephone call, or the system may have sent an incorrect message, etc. For example, the same attributes that are used to define a contact strategy may be used as metrics for assessing actual implementation.

If process 500 determines that the threshold metric was met, process 500 proceeds to step 512. At step 512, process 500 adds the metric to training data for recommended contact strategy for first cMAB model. For example, if a contact strategy was properly implemented, the result may be assigned to the contact strategy and used for training the first cMAB model at step 514.

At step 510, process 500 adds the metric to training data for another contact strategy for first cMAB model. For example, if a contact strategy was not properly implemented, the result may be assigned to a different contact strategy that corresponds to the actual implementation. In such cases, the system may enter the metrics into a database (e.g., a lookup table database) and filter the results to determine metrics of a contact strategy that matches the metrics. The system may then assign the results to that contact strategy.

At step 514, process 500 trains the first cMAB model. For example, the system may train the first cMAB model as described in FIG. 2 above. It should be noted that in some embodiments, the system may train the second cMAB model based on process 500. For example, the system may receive a metric related to an actual implementation of the recommended contact strategy. The system may then compare the metric to threshold metric for the recommended contact strategy. In response to determining that the metric corresponds to the threshold metric, the system may determine to train the second cMAB model based on the actual short-term result.

Additionally or alternatively, the system may train the first and/or second cMAB models based on the results of the second cMAB model. For example, the system may receive a metric related to an actual implementation of the recommended contact strategy. The system may then compare the metric to threshold metric for the recommended contact strategy. In response to determining that the metric corresponds to the threshold metric, the system may determine to train the first and/or second cMAB model based on the actual long-term result.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 2-4 could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method of generating recommendations for contacting users through use of a contextual multi-armed bandit (cMAB) framework in machine learning, the method comprising: inputting, using control circuitry, user data and available contact strategies into a first cMAB model, wherein each of the available contact strategies relates to a different interaction with a user; receiving, using the control circuitry, a first plurality of outputs from the first cMAB model, wherein each of the first plurality of outputs corresponds to a probability associated with one of a first plurality of classifications, and wherein each of the first plurality of classifications relates to a different short-term result of a respective contact strategy of the available contact strategies; inputting, using the control circuitry, the first plurality of outputs from the first cMAB model into a second cMAB model; receiving, using the control circuitry, a second plurality of outputs from the second cMAB model, wherein each of the second plurality of outputs corresponds to a probability associated with one of a second plurality of classifications, and wherein each of the second plurality of classifications relates to a different long-term result of a respective contact strategy of the available contact strategies; and generating, on a display device, a recommendation for a contact strategy based on the second plurality of outputs.

2. The method of embodiment 2, further comprising determining that the user has a debt requiring collection, wherein inputting user data and available contact strategies into a first cMAB model is performed in response to determining that the user has a debt requiring collection.

3. The method of embodiment 2 or 3, further comprising: contacting the user using the recommended contact strategy; storing an actual short-term result of the recommended contact strategy; and training the first cMAB model based on the actual short-term result.

4. The method of embodiment 4, further comprising: receiving a metric related to an actual implementation of recommended contact strategy; comparing the metric to threshold metric for the recommended contact strategy; in response to determining that the metric corresponds to the threshold metric, determining to train the second cMAB model based on the actual short-term result.

5. The method of any one of embodiments 2-4, further comprising: contacting the user using the recommended contact strategy; storing an actual long-term result of the recommended contact strategy; and training the second cMAB model based on the actual long-term result.

6. The method of any one of embodiments 2-5, wherein each of the different short-term result is defined by a first metric and a second metric, wherein the first metric corresponds to a type of user response for the respective contact strategy, and wherein the second metric corresponds to a short-term value received.

7. The method of any one of embodiments 2-6, wherein each of the different short-term result is defined by a first metric and a second metric, wherein the first metric corresponds to a qualitative response for the respective contact strategy, and wherein the second metric corresponds to a quantitative response for the respective contact strategy.

8. The method of any one of embodiments 2-7, wherein the available contact strategies include user-initiated contact strategies, provider-initiated contact strategies, and trigger-based contact strategies.

9. The method of any one of embodiments 2-8, wherein each of the available contact strategies comprises a contact strategy type, a contact strategy content, and a contact strategy frequency.

10. The method of any one of embodiments 2-9, wherein each of the different long-term result is defined by an expected provider profit of the respective contact strategy, wherein the expected provider profit comprises a difference between a value received by a provider and a value to institute the respective contact strategy.

11. A tangible, non-transitory, machine-readable medium storing instructions that, when executed by a data processing apparatus, cause the data processing apparatus to perform operations comprising those of any of embodiments 1-10.

12. A system comprising: one or more processors; and memory storing instructions that, when executed by the processors, cause the processors to effectuate operations comprising those of any of embodiments 1-10.

13. A system comprising means for performing any of embodiments 1-10.

What is claimed is:

1. A system for generating recommendations for contacting users through use of a contextual multi-armed bandit (cMAB) framework in machine learning application, the system comprising:
cloud-based memory configured to:
store a first cMAB model comprising a first neural network; and
store a second cMAB model comprising a second neural network; and
cloud-based control circuitry configured to:
determine that a user has a debt requiring collection;
in response to determining that the user has a debt requiring collection, input user data and available contact strategies into the first cMAB model, wherein each of the available contact strategies relates to a different interaction with a user;
recommend an actual short-term contact strategy;
contact the user using the actual short-term recommended contact strategy;
store a first result of the actual short-term recommended contact strategy, wherein the first result of the actual short-term recommended contact strategy comprises a first combination of attributes including a received amount during a predetermined time period;
normalize the first result of the actual short-term recommended contact strategy into a first feature vector;
train the first cMAB model based on the first feature vector;
receive a first plurality of outputs from the trained first cMAB model, wherein each of the first plurality of outputs corresponds to a respective first probability associated with one of a first plurality of classifications, wherein each of the first plurality of classifications relates to a different short-term result of a respective contact strategy of the available contact strategies, and wherein each of the first plurality of classifications represents a first respective float-point number corresponding to the respective first probability of the different short-term result;
input the first plurality of outputs from the trained first cMAB model comprising into the second cMAB model;
recommend an actual long-term contact strategy;
contact the user using the actual long-term recommended contact strategy;
store a second result of the actual long-term recommended contact strategy, wherein the second result of the actual long-term recommended contact strategy comprises a second combination of attributes including a response time;
normalize the second result of the actual long-term recommended contact strategy into a second feature vector;
train the second cMAB model based on the second feature vector;
receive a second plurality of outputs from the trained second cMAB model, wherein each of the second plurality of outputs corresponds to a respective second probability associated with one of a second plurality of classifications, wherein each of the second plurality of classifications relates to a different long-term result of a respective contact strategy of the available contact strategies, and wherein each of the second plurality of classifications represents a second respective float-point number corresponding to the respective second probability of the different long-term result; and
cloud-based I/O circuitry configured to generate an updated recommended contact strategy for collecting the debt based on the second plurality of outputs.

2. A method of generating recommendations for contacting users through use of a contextual multi-armed bandit (cMAB) framework in machine learning application, the method comprising:
inputting, using control circuitry, user data and available contact strategies into a first cMAB model comprising a first neural network, wherein each of the available contact strategies relates to a different interaction with a user;
recommending an actual short-term contact strategy;

contacting the user using the actual short-term recommended contact strategy;
storing a first result of the actual short-term recommended contact strategy, wherein the first result of the actual short-term recommended contact strategy comprises a first combination of attributes including a received amount during a predetermined time period;
normalizing the first result of the actual short-term recommended contact strategy into a first feature vector;
training the first cMAB model based on the first feature vector;
receiving, using the control circuitry, a first plurality of outputs from the trained first cMAB model, wherein each of the first plurality of outputs corresponds to a respective first probability associated with one of a first plurality of classifications, wherein each of the first plurality of classifications relates to a different short-term result of a respective contact strategy of the available contact strategies, and wherein each of the first plurality of classifications represents a first respective float-point number corresponding to the respective first probability of the different short-term result;
inputting, using the control circuitry, the first plurality of outputs from the trained first cMAB model into a second cMAB model, wherein the second cMAB model comprises a second neural network;
recommending an actual long-term contact strategy;
contacting the user using the actual long-term recommended contact strategy;
storing a second result of the actual long-term recommended contact strategy, wherein the second result of the actual long-term recommended contact strategy comprises a second combination of attributes including a response time;
normalizing the second result of the actual long-term recommended contact strategy into a second feature vector;
training the second cMAB model based on the second feature vector;
receiving, using the control circuitry, a second plurality of outputs from the trained second cMAB model, wherein each of the second plurality of outputs corresponds to a respective second probability associated with one of a second plurality of classifications, wherein each of the second plurality of classifications relates to a different long-term result of a respective contact strategy of the available contact strategies, and wherein each of the second plurality of classifications represents a second respective float-point number corresponding to the respective second probability of the different long-term result; and
generating an updated recommended contact strategy for collecting a debt based on the second plurality of outputs.

3. The method of claim 2, further comprising determining that the user has the debt requiring collection, wherein inputting user data and available contact strategies into the first cMAB model is performed in response to determining that the user has the debt requiring collection.

4. The method of claim 2, further comprising:
receiving a metric related to the actual short-term recommended contact strategy;
comparing the metric to threshold metric for the actual short-term recommended contact strategy; and
in response to determining that the metric corresponds to the threshold metric, determining to train the second cMAB model based on the first result of the actual short-term recommended contact strategy.

5. The method of claim 2, wherein each of the different short-term result is defined by a first metric and a second metric, wherein the first metric corresponds to a type of user response for the respective contact strategy, and wherein the second metric corresponds to a short-term value received.

6. The method of claim 2, wherein each of the different short-term result is defined by a first metric and a second metric, wherein the first metric corresponds to a qualitative response for the respective contact strategy, and wherein the second metric corresponds to a quantitative response for the respective contact strategy.

7. The method of claim 2, wherein the available contact strategies include user-initiated contact strategies, provider-initiated contact strategies, and trigger-based contact strategies.

8. The method of claim 2, wherein each of the available contact strategies comprises a contact strategy type, a contact strategy content, and a contact strategy frequency.

9. The method of claim 2, wherein each of the different long-term result is defined by an expected provider profit of the respective contact strategy, wherein the expected provider profit comprises a difference between a value received by a provider and a value to institute the respective contact strategy.

10. One or more non-transitory computer-readable media for generating recommendations for contacting users through use of a contextual multi-armed bandit (cMAB) framework in machine learning application, comprising instructions that, when executed by one or more processors, effectuate operations comprising:
inputting user data and available contact strategies into a first cMAB model comprising a first neural network, wherein each of the available contact strategies relates to a different interaction with a user;
recommending an actual short-term contact strategy;
contacting the user using the actual short-term recommended contact strategy;
storing a first result of the actual short-term recommended contact strategy, wherein the first result of the actual short-term recommended contact strategy comprises a first combination of attributes including a received amount during a predetermined time period;
normalizing the first result of the actual short-term recommended contact strategy into a first feature vector;
training the first cMAB model based on the first feature vector;
receiving a first plurality of outputs from the trained first cMAB model, wherein each of the first plurality of outputs corresponds to a respective first probability associated with one of a first plurality of classifications, wherein each of the first plurality of classifications relates to a different short-term result of a respective contact strategy of the available contact strategies, and wherein each of the first plurality of classifications represents a first respective float-point number corresponding to the respective first probability of the different short-term result;
inputting the first plurality of outputs from the trained first cMAB model into a second cMAB model, and wherein the second cMAB model comprises a second neural network;
recommending an actual long-term contact strategy;
contacting the user using the actual long-term recommended contact strategy;

storing a second result of the actual long-term recommended contact strategy, wherein the second result of the actual long-term recommended contact strategy comprises a second combination of attributes including a response time;

normalizing the second result of the actual long-term recommended contact strategy into a second feature vector;

training the second cMAB model based on the second feature vector;

receiving a second plurality of outputs from the trained second cMAB model, wherein each of the second plurality of outputs corresponds to a respective second probability associated with one of a second plurality of classifications, wherein each of the second plurality of classifications relates to a different long-term result of a respective contact strategy of the available contact strategies, and wherein each of the second plurality of classifications represents a second respective float-point number corresponding to the respective second probability of the different long-term result; and generating an updated recommended contact strategy for collecting a debt based on the second plurality of outputs.

11. The one or more non-transitory computer-readable media of claim 10, wherein the operations further comprise:
determining that the user has the debt requiring collection, wherein inputting user data and available contact strategies into the first cMAB model is performed in response to determining that the user has the debt requiring collection.

12. The one or more non-transitory computer-readable media of claim 10, wherein the operations further comprising:
receiving a metric related to the actual short-term recommended contact strategy;

comparing the metric to threshold metric for the actual short-term recommended contact strategy; and in response to determining that the metric corresponds to the threshold metric, determining to train the second cMAB model based on the first result of the actual short-term recommended contact strategy.

13. The one or more non-transitory computer-readable media of claim 10, wherein each of the different short-term result is defined by a first metric and a second metric, wherein the first metric corresponds to a type of user response for the respective contact strategy, and wherein the second metric corresponds to a short-term value received.

14. The one or more non-transitory computer-readable media of claim 10, wherein each of the different short-term result is defined by a first metric and a second metric, wherein the first metric corresponds to a qualitative response for the respective contact strategy, and wherein the second metric corresponds to a quantitative response for the respective contact strategy.

15. The one or more non-transitory computer-readable media of claim 10, wherein the available contact strategies include user-initiated contact strategies, provider-initiated contact strategies, and trigger-based contact strategies, and wherein each of the available contact strategies comprises a contact strategy type, a contact strategy content, and a contact strategy frequency.

16. The one or more non-transitory computer-readable media of claim 10, wherein each of the different long-term result is defined by an expected provider profit of the respective contact strategy, wherein the expected provider profit comprises a difference between a value received by a provider and a value to institute the respective contact strategy.

* * * * *